US005357407A

United States Patent [19]

Woods

[11] Patent Number: 5,357,407

[45] Date of Patent: Oct. 18, 1994

[54] LIGHT ATTENUATOR FOR HIGH/LOW BEAM VEHICLE HEADLIGHT BULB

[76] Inventor: Michael E. Woods, 1162 Ridge Rd., Pylesville, Md. 21132

[21] Appl. No.: 58,368

[22] Filed: May 10, 1993

[51] Int. Cl.$^5$ .................................................. B60Q 1/00

[52] U.S. Cl. ........................................ 362/61; 362/280; 362/293; 362/319

[58] Field of Search .................. 362/61, 293, 280, 319, 362/277, 226, 341, 351, 284

[56] References Cited

U.S. PATENT DOCUMENTS

| | | | |
|---|---|---|---|
| 1,602,289 | 10/1926 | Tanner ................................ | 362/319 |
| 1,880,893 | 10/1932 | Dodge . | |
| 1,988,933 | 1/1935 | Asakawa . | |
| 2,260,473 | 6/1940 | Minchillo . | |
| 2,563,552 | 8/1951 | Roben . | |
| 2,945,985 | 4/1958 | Madsen . | |
| 3,646,386 | 2/1972 | Rijnders . | |
| 4,047,020 | 9/1977 | Noren .................................. | 362/293 |
| 4,538,213 | 8/1985 | Martin . | |
| 4,564,783 | 1/1986 | Krieg et al. . | |
| 4,951,178 | 8/1990 | Shirai .................................... | 362/61 |
| 5,213,406 | 5/1993 | Neumann ............................. | 362/61 |

FOREIGN PATENT DOCUMENTS

| | | | |
|---|---|---|---|
| 309640 | 4/1929 | United Kingdom ................ | 362/293 |

*Primary Examiner*—James C. Yeung

*Attorney, Agent, or Firm*—Jacobson, Price, Holman & Stern

[57] ABSTRACT

A light attenuator sleeve which removably attaches to a high/low beam halogen vehicle headlight bulb. The sleeve is designed to fit onto the high/low beam bulb assembly so that light emitted by the bulb passes through the sleeve and the intensity of the light is attenuated. The sleeve is attached to the high/low beam bulb assembly after the low beam filament is expired and has an appropriate degree of opaqueness to attenuate light emitted by the high beam filament to a low beam intensity after passing through the sleeve.

9 Claims, 2 Drawing Sheets

LIGHT ATTENUATOR FOR HIGH/LOW BEAM VEHICLE HEADLIGHT BULB

BACKGROUND OF THE INVENTION

The present invention relates to a device for extending the life of a high/low beam vehicle headlight bulb, and more specifically to a removable light attenuator sleeve for a high/low beam vehicle headlight bulb.

Automobiles and other vehicles operate at night by the use of vehicle headlights. Most automobile headlights are equipped with low beam and high beam capabilities. Low beam is used for normal night driving conditions and high beam is used for particularly dark roads. Currently, the high/low beam function is provided for in two ways. The first is by a dual light bulb unit in which high beam and low beam filaments are housed in separate self-contained reflector housings. The second is a high/low beam halogen bulb.

The high/low beam halogen bulb is a smaller, yet higher performance device which is easily mounted into a reflector housing in an automobile. The bulb contains a low beam filament and a high beam filament, and typically costs more to replace than the dual light bulb unit. The low beam filament in the halogen bulb is used much more frequently than the high beam filament. As a result, the low beam filament burns out long before the high beam filament. Accordingly, because it is illegal to operate a vehicle with only high beam headlights, the halogen bulb must be replaced with a new bulb to obtain low beam performance. Therefore, the halogen bulb must be disposed of while there is still useful life left, albeit only in the high beam filament.

The present invention is directed to a device which fits over a high/low beam bulb and obviates the need to dispose of the high/low beam halogen bulb when the low beam filament is burned out.

Examples of headlight filter devices are shown in U.S. Pat. Nos. 2,563,552; 1,880,893; 2,260,473; 2,945,985; and 4,538,213. The devices disclosed in these patents are designed to alter the color of the light beam to optimize vision in fog conditions, and are primarily related to filter devices which attach over the transparent plastic housing of the vehicle headlight, thus being exposed on the exterior of the vehicle.

SUMMARY OF THE INVENTION

It is a primary object of the present invention to provide a device for extending the life of a high/low beam halogen vehicle headlight bulb.

It is another object of the present invention to provide a device which extends the life of a high/low beam halogen vehicle headlight bulb when the low beam filament of the bulb is expired.

Briefly, the present invention is directed to a light attenuator sleeve which removably attaches to a high/low beam halogen vehicle headlight bulb. The halogen bulb is contained within a reflector housing and the sleeve is designed to fit onto the high/low beam bulb assembly so that light emitted by the bulb passes through the sleeve and the intensity of the light is thereby attenuated. Specifically, the sleeve is attached to the high/low beam bulb assembly after the low beam filament is expired. The sleeve has an appropriate degree of opaqueness to attenuate light emitted by the high beam filament to a low beam intensity.

The sleeve may be disposable and include a backed adhesive for attaching to the high/low beam bulb assembly. Alternatively, the sleeve may removably attach to the bulb assembly by a separable magnetic ring.

The attenuator sleeve of the present invention is designed to attenuate the brightness of the light emitted by the high beam filament from a high/low beam bulb, without altering the color of the light.

The above and other objects and advantages of the present invention will become more readily apparent when reference is made to the following description taken in conjunction with accompanying drawings.

DETAILED DESCRIPTION OF THE DRAWINGS

Figure 1:
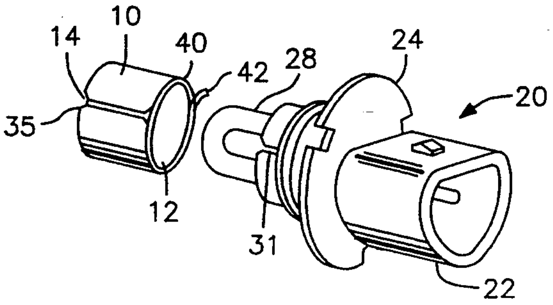
FIG. 1 is a perspective view of the attenuator sleeve and halogen bulb assembly with the sleeve unattached, in accordance with a first embodiment of the invention.
Figure 2:
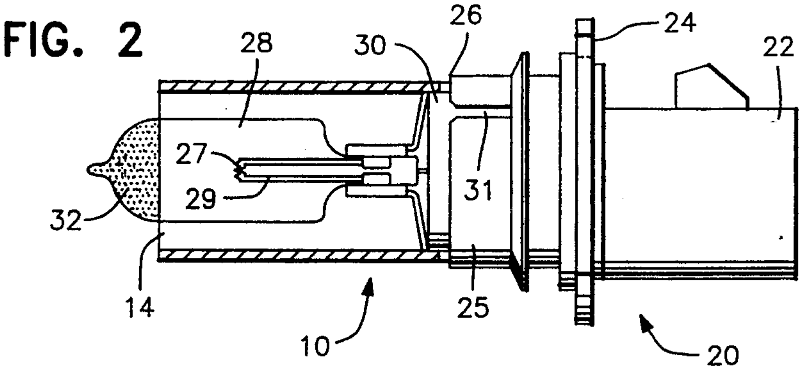
FIG. 2 is a sectional view illustrating the attenuator sleeve attached to the halogen bulb assembly in accordance with the first embodiment.

Referring first to FIGS. 1 and 2, the light attenuator sleeve according to the first embodiment is shown at 10, and is designed to fit onto a high/low beam halogen bulb assembly 20. The attenuator sleeve comprises a hollow cylindrical body which is open at both proximal end 12 and distal end 14. The bulb assembly 20, which is well known in the art, has a plastic base 22, a mounting flange 24, and socket mating member 25 having a forward rim 26. A bulb 28 is supported on a metal ring 30, and has a high beam filament 27 and low beam filament 29. The bulb assembly 20 is designed to be removable from a socket (not shown) in the front of an automobile. The bulb 28 typically has a layer of reflective material 32 coated on the distal end, the purpose of which will be described hereinafter.

The sleeve 10 is formed of a material which allows light to pass therethrough without altering the color of the light. However, a material of sufficient degree of opaqueness is chosen, or the sleeve is coated with a coating of sufficient opaqueness. The specific type of material and/or coating may be readily chosen by one with ordinary skill in the art. The intensity of the light which passes through the sleeve is attenuated in intensity such that light emitted from a high beam filament which passes through the sleeve is substantially equal to light emitted unattenuated from a low beam filament.

Figure 3:
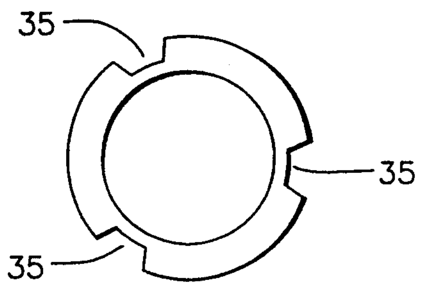
FIG. 3 is a profile view of the attenuator sleeve according to the present invention.

The sleeve 10 has an external diameter equal to the outside diameter of the socket mating member 25. In addition, the sleeve 10 has a profile or outline, as shown in FIG. 3, which includes three grooves 35. The grooves 35 are positioned around the sleeve 10 to correspond with three similar grooves 27 on the socket mating member 25. The grooves 31 mate with tab members on a socket (not shown) into which the bulb assembly is mounted. Therefore, to ensure that the bulb assembly 20 may still be received in the socket with the sleeve 10 mounted on it; the sleeve 10 includes similar grooves extending along its length. This is important insofar as the sleeve 10 is designed to fit on the surface of the forward rim 26, which terminates at the forward end of the socket mating member 25. Consequently, the profile of the sleeve 10 shown in FIG. 3 would be identical to the profile of the socket mating member 25.

In the first embodiment, the sleeve 10 is glued onto the forward rim 26 of the bulb assembly 20. To this end, a layer of adhesive 40 is applied to the edge at the proximal end 12 of the sleeve, and is covered by a peelaway backing 42. Many types of adhesives well known in the art would be suitable for securing the sleeve 10 to the plastic surface of the forward rim. Preferably, the adhesive should be resistant to relatively high temperatures because of the heat that is generated by the bulb 28 in use. When attaching the sleeve 10 to the bulb assembly, the backing 42 is removed and the sleeve 10 is placed over the bulb 28 and secured to the forward rim 26.

Figure 4:
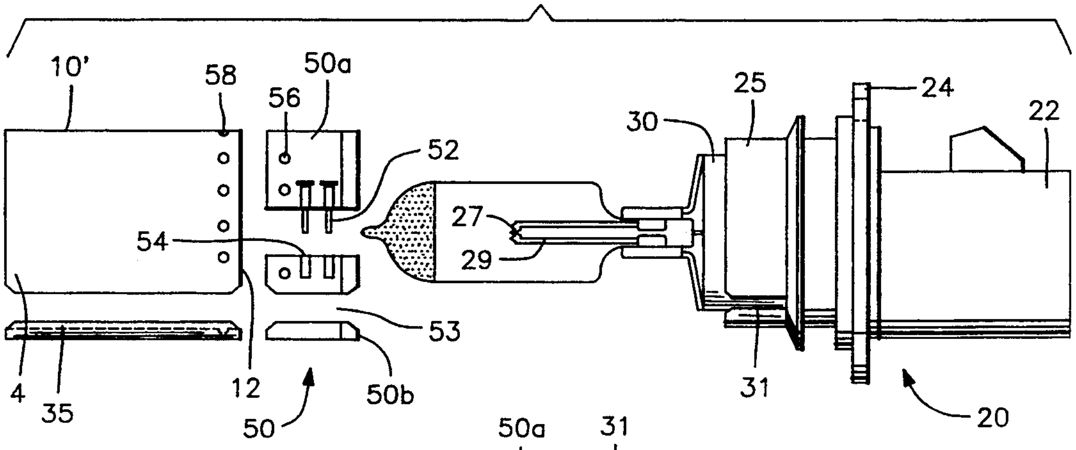
FIG. 4 is an exploded view of the attenuator sleeve, removable magnetic attachment ring, and halogen bulb assembly in accordance with the second embodiment of the present invention.
Figure 5:
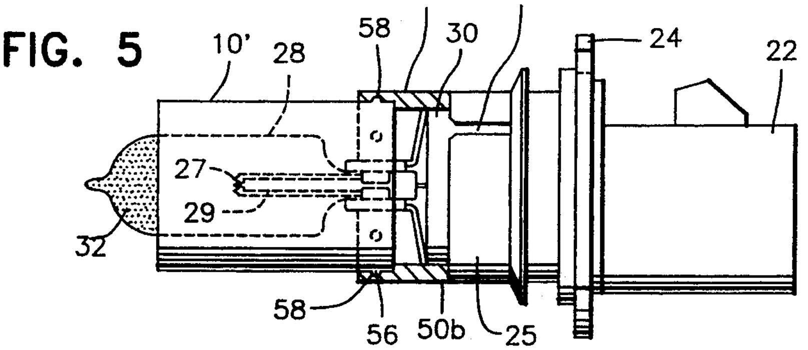
FIG. 5 is a sectional view illustrating the attenuator sleeve attached to the halogen bulb assembly in accordance with the second embodiment.

Turning to FIGS. 4 and 5, the attentuator sleeve according to the second embodiment is shown at 10'. In this embodiment the sleeve 10' is similar to sleeve 10 except for the manner in which it attaches to the bulb assembly 20. The sleeve 10' is designed to be reusable, and in this regard, to be removable from the bulb assembly.

A separable magnetic mounting ring 50 comprising half-rings **50*a* and 50*b* is provided. Each half-ring is formed of magnetic material. The half-rings 50*a* and 50*b* are detachably connected together by pins 52 on half-ring 50*a* which mate with and lock into holes 54 on half-ring 50*b*. There are mating pins and holes on each side of the half-rings, though only one pair is illustrated. The magnetic rings include grooves 53 which correspond to and align with the grooves 31 of the socket mating member 25 and grooves 35 of the sleeve 10. In addition, along a forward end of the ring 50 are provided a plurality of holes 56. The holes 56 receive a plurality of dimples or bubbles 58 at the proximal end 12 of the sleeve 10' so that the magnetic ring 50 may snap around the sleeve 10'**.

In attaching the sleeve 10' to the bulb assembly 20, the magnetic half-rings **50*a* and 50*b*, initially apart are attached together around the sleeve 10 and placed around the metal ring 30. The half-rings 50*a* and 50*b* are then fastened together to form the single piece magnetic ring 50. The magnetic ring 50 is magnetized sufficiently to attach to a metal ring 30. In some halogen bulb assemblies, the metal ring 30 extends a greater distance from the plastic casing and thus provides a large surface area to secure the magnetic ring 50. The holes 56 in the magnetic ring receive the dimples 58 of the sleeve 10 and thus clamp the sleeve 10' to the magnetic ring 50 as shown in FIG. 5. The magnetic ring 50 may be removed from the metal ring 30 by pulling ring 50 away from the metal ring 30 with sufficient force to overcome the magnetic attraction between the two members. Thus, the sleeve 10' may be reused even when the high beam filament of the bulb 28** expires and a new bulb assembly is installed, the low beam filament of which will eventually burn out before the high beam filament.

Figure 6:
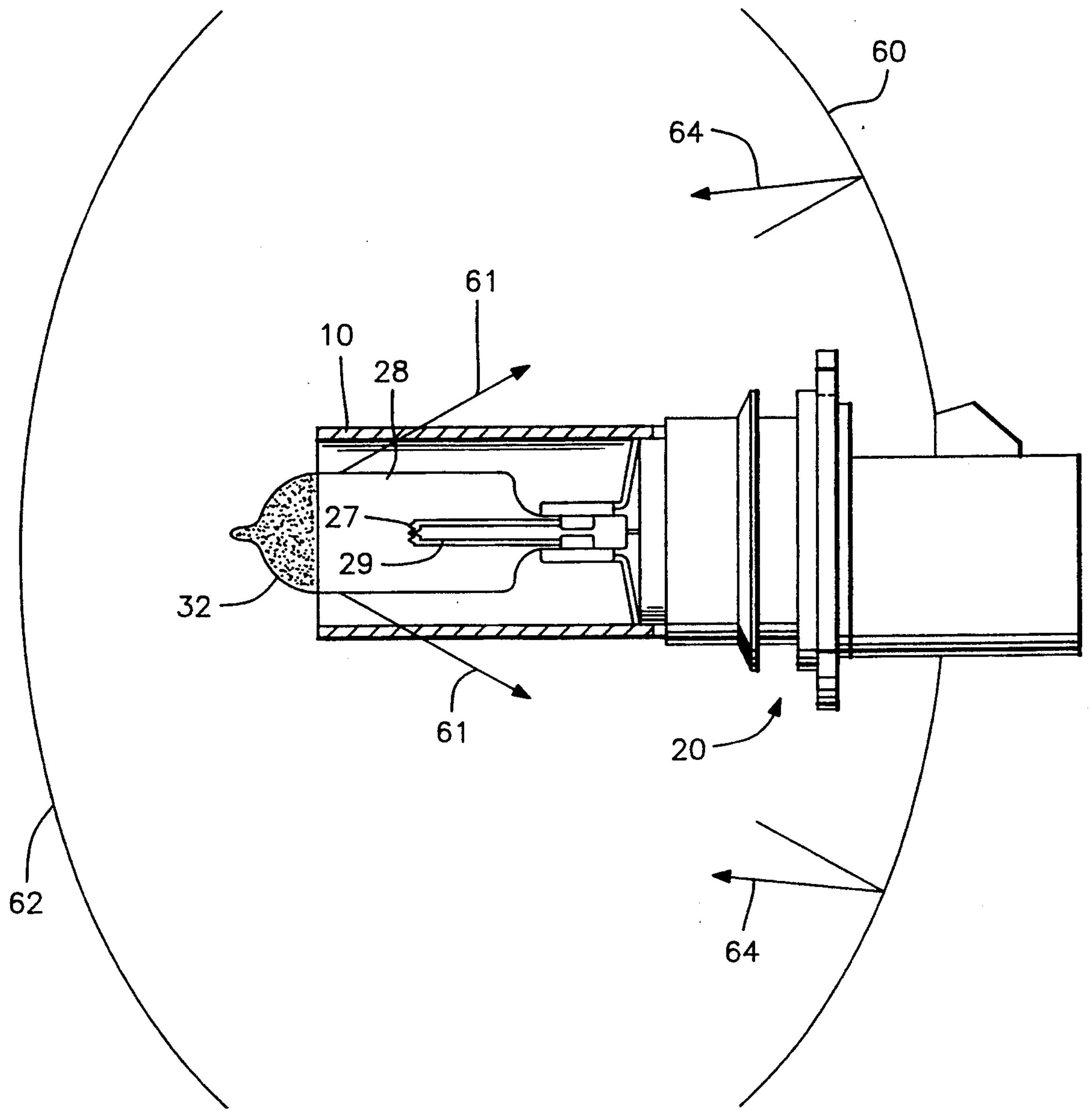
FIG. 6 is a sectional view of the attenuator sleeve and associated rear deflector and front headlight shield and illustrating the operation of the sleeve.

The operation of the sleeve 10 or 10' will be described with reference to FIG. 6. Most high/low beam halogen bulbs have a reflective coating 32 which reflects light emitted by the filaments to a rear reflector 60 mounted in the headlight housing area. This is represented by the arrows 61 shown in FIG. 6. When the sleeve is used, only the high beam filament 27 is active. The light emitted by the high beam filament passes through the sleeve 10 and is thus attenuated in intensity before it hits the reflector 60. The light which hits the reflector 60 is at a low beam intensity. This low beam intensity light is then reflected by the reflector 60 through the front headlight shield 62 as represented by the arrows 64.

The sleeve 10 or 10' is sized so as to extend from the bulb assembly housing substantially to the reflective coating or at least just short of the coating so that substantially all of the light reflected by the coating 32 passes through the sleeve. The sleeve may be formed of a heat resistant plastic material or glass, by any known manufacturing technique including extrusion. Again, the sleeve has an appropriate degree of opaqueness to reduce the intensity of the light while not affecting the color of the light emitted by the halogen bulb filaments.

Keeping with the spirit of the present invention to extend the life of a halogen bulb, and thus prevent unnecessary waste, the sleeve 10' is designed to be reusable. Sleeve 10' may be stored in the glove compartment of a vehicle and attached to a halogen bulb assembly when needed.

Sleeve 10 of the first embodiment may also be reusable. The sleeve 10 may be pried off the bulb assembly with an appropriate tool. The dried adhesive can be scraped off and replaced with fresh adhesive for use on another halogen bulb assembly. Alternatively, sleeve 10 may be disposed of with the bulb assembly after the high beam filament expires.

The sleeve 10 or 10' is very inexpensive to manufacture and extends the life of a rather expensive halogen bulb assembly. A consumer can save a significant amount of money by using the bulb beyond the life of the low beam filament.

It is also envisioned that the sleeve may be packaged and sold with a high/low beam bulb. In this case, the bulb manufacturer could provide a simple attachment structure on the sleeve, such as, for example, small raised barbed projections which would extend from the end of the sleeve and embed in the surface of the forward rim of the bulb assembly. The barbs on the projections would resist pulling of the sleeve off the forward rim. The sleeve could be attached by the consumer when the low beam filament burns out. It may be removed by prying it from the forward rim, breaking the projections, and reused later on another bulb assembly with adhesive.

The above description is intended by way of example only and is not intended to limit the present invention in any way except as set forth in the following claims.

I claim:

1. A light attenuator sleeve for attachment to a high/-low beam vehicle bulb having a high beam filament and a low beam filament, the attenuator sleeve comprising:
   - a sleeve body having a degree of opaqueness for attenuating the light emitted from said high beam filament such that the intensity of light emitted by said bulb when the high beam filament is energized is substantially equal to that emitted by said low beam filament, said body comprising a proximal end and distal end each having a substantially circular rim;
   - removable attaching means suitable for removably attaching the proximal end Of the sleeve body to a support member which supports the base of the high/low beam vehicle bulb.

2. The light attenuator sleeve of claim 1, wherein said means for attaching comprises:

a magnetic ring comprised of two separable half-ring members, said magnetic ring being sized and shaped to fit and magnetically secure to a metal rim of said high/low beam bulb and having a plurality of circumferentially disposed holes; and wherein said sleeve body comprises a plurality of raised and bubbles for mating with the dimples on said magnetic ring to removably fit inside said magnetic ring.

3. The light attenuator sleeve of claim 1, wherein said sleeve body has a profile identical to a profile of a socket mating member of said high/low bulb.

4. The light attenuator sleeve of claim 3, wherein said sleeve body has a plurality of grooves extending along its length and positioned to correspond to grooves on said socket mating member of said high/low beam bulb.

5. In combination, a high/low beam vehicle bulb assembly and light attenuator sleeve, the vehicle bulb assembly comprising a bulb having a high beam filament and a low beam filament, and a bulb mounting assembly for mounting in a socket in a vehicle, the bulb mounting assembly comprising a support member at a base of the bulb for supporting the bulb, the light attenuator sleeve comprising a sleeve body having a degree of opaqueness, proximal and distal ends each having substantially circular rims, and for means removably attaching the proximal end of the sleeve body onto the support member whereby the sleeve body surrounds the high/low beam bulb to extend the life of the high/-low beam bulb when the low beam of the bulb expires.

6. The combination of claim 5, wherein the support member of the high/low beam vehicle bulb assembly comprises a ring member which circumscribes a base of the bulb, and the removable attachment means removably attaches around the ring member.

7. A method for extending the life of a high/low beam vehicle headlight bulb when the low beam filament is exhausted, the method comprising the steps of:

providing an attenuator sleeve having a degree of opaqueness for attenuating the intensity of light emitted by a high beam filament to an intensity of substantially that of light emitted by a low beam filament; and removably attaching the attenuator sleeve to a support member at a base of the high/low beam vehicle headlight bulb so that the attenuator sleeve surrounds the headlight bulb and light which is emitted from the bulb passes through the attenuator sleeve.

8. The method of claim 7, wherein the step of attaching comprises mounting a magnetic ring to a metallic surface of the high/low beam vehicle headlight bulb and mounting the sleeve into the magnetic ring.

9. The method of claim 7, wherein the step of removably attaching comprises removably attaching a substantially circular rim at a proximal end of the sleeve around a ring member which circumscribes the base of the vehicle bulb.

* * * * *